UNITED STATES PATENT OFFICE 2,315,061

PROTECTIVE COMPOSITION OF MATTER FOR USERS OF X-RAYS

Emory O. King, Kansas City, Kans., assignor of one-third to Jack C. Booher and one-third to Willa W. Daywalt, both of Kansas City, Mo.

No Drawing. Application May 26, 1941, Serial No. 395,242

2 Claims. (Cl. 250—108)

This invention relates to a protective composition of matter that is impervious to X-rays and therefore, useful in the production of wearing apparel for operators of X-ray equipment.

The primary object of this invention is to provide flexible material from which aprons, gowns, gloves and protective blankets may be formed for use by operators of X-ray equipment and which, when worn, will prevent harmful influence of the said rays.

It is well-known in the art of handling X-ray equipment that continually subjecting parts of the body to the rays has a destructive effect upon the cells, and if protection is inadequate, the exposed member soon becomes lifeless and devoid of sense of feeling. At the same time, it is known that protective equipment, now available, is cumbersome, undesirably heavy, and prevents the desired tactile sense of hands and fingers by those required to treat parts of the human body.

It is therefore, a further object of this invention to provide a protective composition that is impervious to X-rays and which will be flexible, relatively light in weight, thin enough to permit successfully conducting operations where the sense of touch plays a part, and capable of being manipulated to form wearing apparel of various character.

Another aim of the present invention is to provide a flexible composition of matter having as a part thereof, lead monoxide, barium sulphate and bismuth oxychloride in sufficient quantities to produce sheet substances impervious to X-rays and having a repulsive effect upon such rays equal to ½ millimeter of lead.

Other objects of the invention, the manner of producing the composition of matter, and advantages arising therefrom, will appear during the course of the following specification, wherein the preferred way of associating the ingredients will be set down.

It has been found commercially practicable to use liquid latex or a compounded rubber as the vehicle or body-forming substance. The use of these materials insures lightness, flexibility and ease of production. The liquid latex used should have a rubber content of 55 per cent and the compounded rubber may be purchased on the open market under the trade-mark "Lotol." When making the composition for use in industrial plants, the compounded rubber should be utilized in lieu of liquid latex.

To the liquid latex or compounded rubber is added a composition comprising the following, in the proportions set down:

| | Per cent |
|---|---|
| Lead monoxide | 78 |
| Barium sulphate | 14 |
| Bismuth oxychloride | 8 |

Sufficient water to produce a paste.

When mixing the composition comprising the ingredients just tabulated, the water should have a temperature ranging from 50 to 65° F. Very thorough agitation is essential to insure a smooth product and any mechanical mixer may be employed.

When liquid latex is used to receive the composition, produced from lead monoxide, barium sulphate, bismuth oxychloride and water, 3 parts of liquid latex should be used to 1 part of the composition. The composition should be added to the liquid latex very slowly and with gentle rather than violent stirring, to the end that bubbles may be avoided and that no gases are liberated from the latex.

The lead monoxide, barium sulphate and bismuth oxychloride is dispersed throughout the solution, after which it is spread to form a sheet or employed in the production of gloves, for example, by the application to a form through dipping. Relatively thin coats of the composition establishes a protective covering and when the material is from .030 to .040 inch in thickness, its repulsive effect is the same as ½ millimeter of lead.

When the three aforesaid ingredients are mixed with compounded rubber, 2 parts of compounded rubber in liquid form, to 1 part of the mixture will produce a heavier material capable of withstanding shearing and bending stresses so that aprons, gloves or gowns made of compounded rubber and the said mixture, may be employed commercially in the handling of machine parts, castings, tires or other products where X-rays are used for inspection or the like.

When the latex and mixture composition of lead monoxide, barium sulphate and bismuth oxychloride is spread to produce a sheet or placed upon a mold, curing is accomplished by confining the substance in a compartment having a temperature of from 100 to 125° F. for at least 15 min., after which tempering in a water bath at 160° F. should take place. When "building up" a glove, for example, the mold is first dipped into the material and then cured as just mentioned, after which additional dippings and curings may take place until the desired thickness is obtained.

When using compounded rubber, the coagulation method of curing is preferable—the dipped form or sheet of material is submerged in a solution composed of 1 part of methyl alcohol to 9 parts glacial acetic acid. The material is left in this coagulation solution from 2 to 3 min., after which the excess moisture is evaporated by the application of warm air. The material is next placed in boiling water or confined in an oven having a temperature of in excess of 210° F. for not less than 40 min.

The examples of curing are satisfactory and practicable but form no part of the invention other than in association with the complete production of a protective composition having the three ingredients above mentioned. In fact, there are many commercial ways of curing the latex or compounded rubber after it has received the lead monoxide, barium sulphate and bismuth oxychloride in the proportions tabulated. The three ingredients are comparatively easy to obtain and may be mixed without objectionable expense, and while this specification discloses one example and the precise way of producing the composition, it is desired to be limited only by the scope of the appended claims.

Having thus described the invention, what is claimed as new and desired to be secured by Letters Patent is:

1. A protective composition impervious to X-rays comprising a body of flexible material; and a mixture composed of ten (10) parts lead monoxide, two (2) parts barium sulphate, and one (1) part bismuth oxychloride, evenly dispersed throughout said body.

2. A composition for addition to rubber or the like to render the same impervious to X-rays comprising the following ingredients in substantially the indicated proportions by weight: lead monoxide—78%, barium sulphate—14%, bismuth oxychloride—8%, and sufficient water to produce a paste.

EMORY O. KING.